United States Patent [19]

Örnberg

[11] Patent Number: 5,533,432

[45] Date of Patent: Jul. 9, 1996

[54] SAW ASSEMBLY

[75] Inventor: Rolf Örnberg, Malå, Sweden

[73] Assignee: Hultdin Invest AB, Mala, Sweden

[21] Appl. No.: 335,840

[22] PCT Filed: May 8, 1992

[86] PCT No.: PCT/SE92/00300

§ 371 Date: Nov. 8, 1994

§ 102(e) Date: Nov. 8, 1994

[87] PCT Pub. No.: WO92/23218

PCT Pub. Date: Nov. 25, 1993

[30] Foreign Application Priority Data

Mar. 13, 1991 [SE] Sweden ................... 9100756

[51] Int. Cl.$^6$ ................................... B27B 17/14
[52] U.S. Cl. ................................... 83/819; 30/386
[58] Field of Search ........................ 83/819, 818, 816; 30/386, 383, 385, 384

[56] References Cited

U.S. PATENT DOCUMENTS

| 3,279,508 | 10/1966 | Ehlen et al. ................... 83/818 |
| 4,382,334 | 5/1983 | Reynolds . | |
| 4,915,317 | 4/1990 | Birch ........................... 83/819 |
| 5,396,705 | 3/1995 | Leini ............................ 30/386 |

FOREIGN PATENT DOCUMENTS

| 0595152 | 2/1978 | U.S.S.R. ...................... 30/384 |
| 745440 | 7/1980 | U.S.S.R. . | |

Primary Examiner—Kenneth E. Peterson
Assistant Examiner—Sean A. Pryor
Attorney, Agent, or Firm—Nixon & Vanderhye

[57] ABSTRACT

A saw assembly comprising a bar (9) mounted in a holder (24); a displaceable unit (22) including the bar (9) and mounted on the bar holder (24) to displace the bar (9) in relation to the holder (24); and a first hydraulic piston cylinder member (16) which displaces the unit (22) in relation to the bar holder (24) so that the bar (9) automatically stretches the saw chain (11). According to the invention the displaceable unit (22) comprises a block element (25) which is joined to an inner bar attachment (20) supporting the bar (9), a small gap thus being formed between opposing surfaces, the cylinder member (16) being arranged in the block element (25) to abut against the bar holder. A second hydraulic piston cylinder member (17) is arranged in the block element (25), parallel with the axis of rotation (36) of the bar holder, the piston cylinder member (17) being arranged to abut against the bar holder (24) in order to secure the unit (22) to the bar holder (24) and eliminate the clearance produced by the gap.

5 Claims, 4 Drawing Sheets

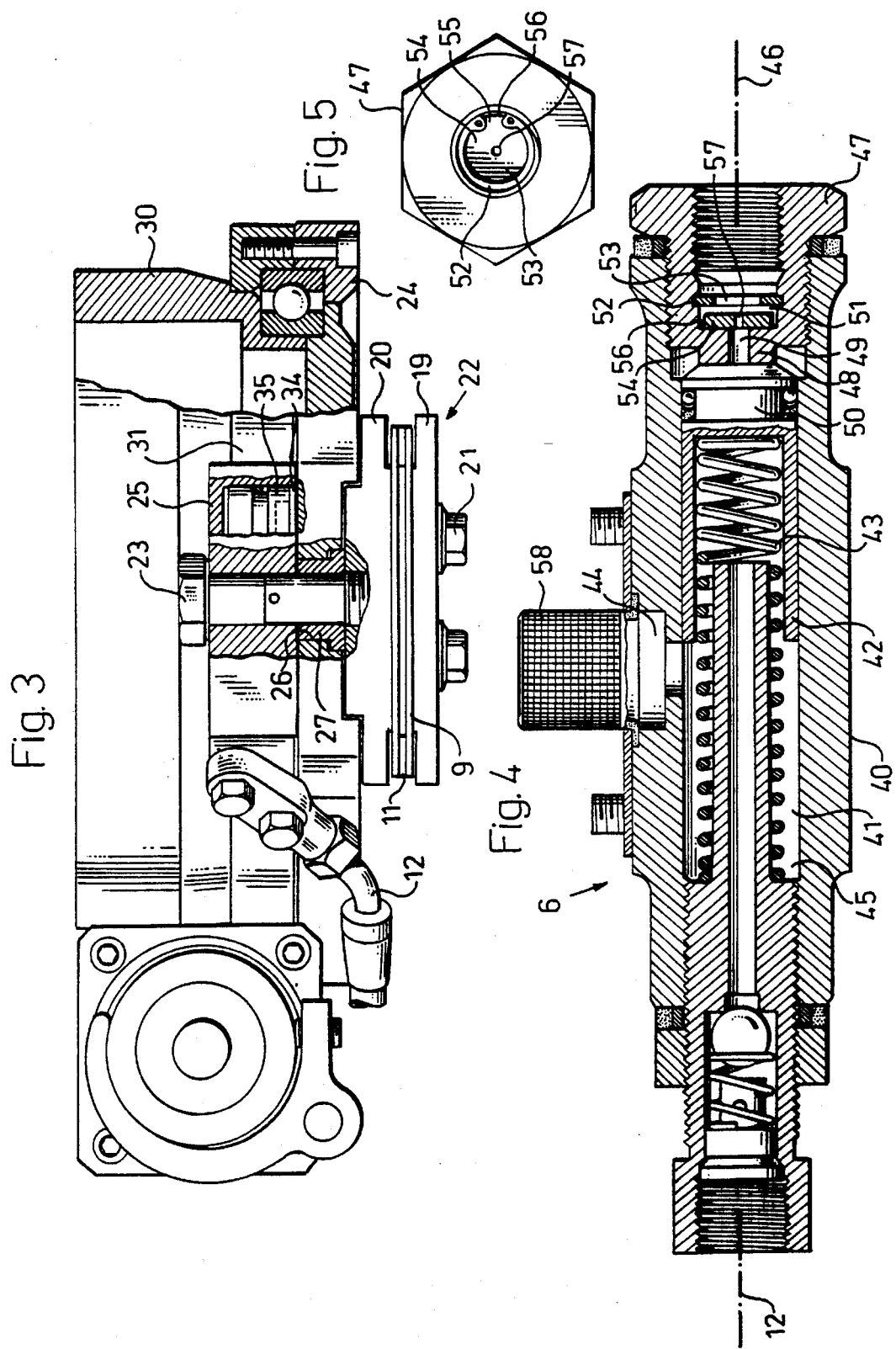

SAW ASSEMBLY

The present invention relates to a saw assembly comprising a bar mounted in a holder, said holder being pivotable about a shaft; a saw chain running around the bar; a saw motor driving the saw chain; a cylinder to feed the bar in and out during rotation about said shaft; a hydraulic circuit system in which said saw motor and cylinder for feeding in and out are included; a displaceable unit including said bar and mounted on said bar holder to displace the bar in relation to the bar holder in a direction corresponding to the longitudinal centre line of the bar and which is perpendicular to said axis of rotation; and a first hydraulic piston cylinder member which is arranged to be activated by said hydraulic circuit system and displace the unit in relation to the bar holder so that during operation of the saw assembly the bar in the unit automatically stretches the saw chain.

In saw assemblies of the type described above, included in various types of felling aggregates for processors, the saw chain must be stretched in order to reduce the risk of it being jerked off the bar and to position the chain correctly around the bar. In practice this stretching must be performed manually several times during each work shift. Despite repeated manual stretching the saw chain is frequently jerked off and thrown with considerable force from the felling aggregate. It is often difficult or even impossible to find the saw chain again. An automatic stretching device is known through SU-745 400. This stretching device is in the form of a hydraulic cylinder connected by one end to the bar holder and by the other end to the bar. The clearance normally existing between the constructional elements permits movements of the bar directed perpendicularly to the bar plane. Such movements are not desirable since they may cause the bar to become wedged and break during sawing.

The object of the present invention is to provide a saw assembly which enables automatic stretching of the chain while at the same time allowing the bar to be secured in a controlled manner.

The invention is substantially characterized in that the displaceable unit comprises a block element arranged on the side of the bar holder facing away from the bar, and joined to an inner bar attachment supporting the bar, a small gap thus being formed between opposing surfaces of the bar holder and block element, that the first piston cylinder member is arranged in the block element with its piston rod protruding therefrom to abut against a support surface of the bar holder, and that a second hydraulic piston cylinder member is arranged in the block element, parallel with said shaft, the piston rods of the piston cylinder member being arranged to abut against the bar holder with a predetermined total tension force in order, during normal operation, to fix the movable unit to the bar holder and eliminate the clearance produced by said gap, said tension being less than the stretching force created by the first piston cylinder member, whereby the second piston cylinder member is influenced by the pressure in said hydraulic circuit system.

The invention will be described further with reference to the accompanying drawings.

FIG. 3 is an end view of a saw assembly according to FIG. 2 seen from the end of the saw chain.

FIG. 4 is a longitudinal section through the lubricating oil pump included in the hydraulic system according to FIG. 1.

FIG. 5 is an end view of a nipple arranged at the inlet end of the lubricating oil pump according to FIG. 4.

Figure 1:
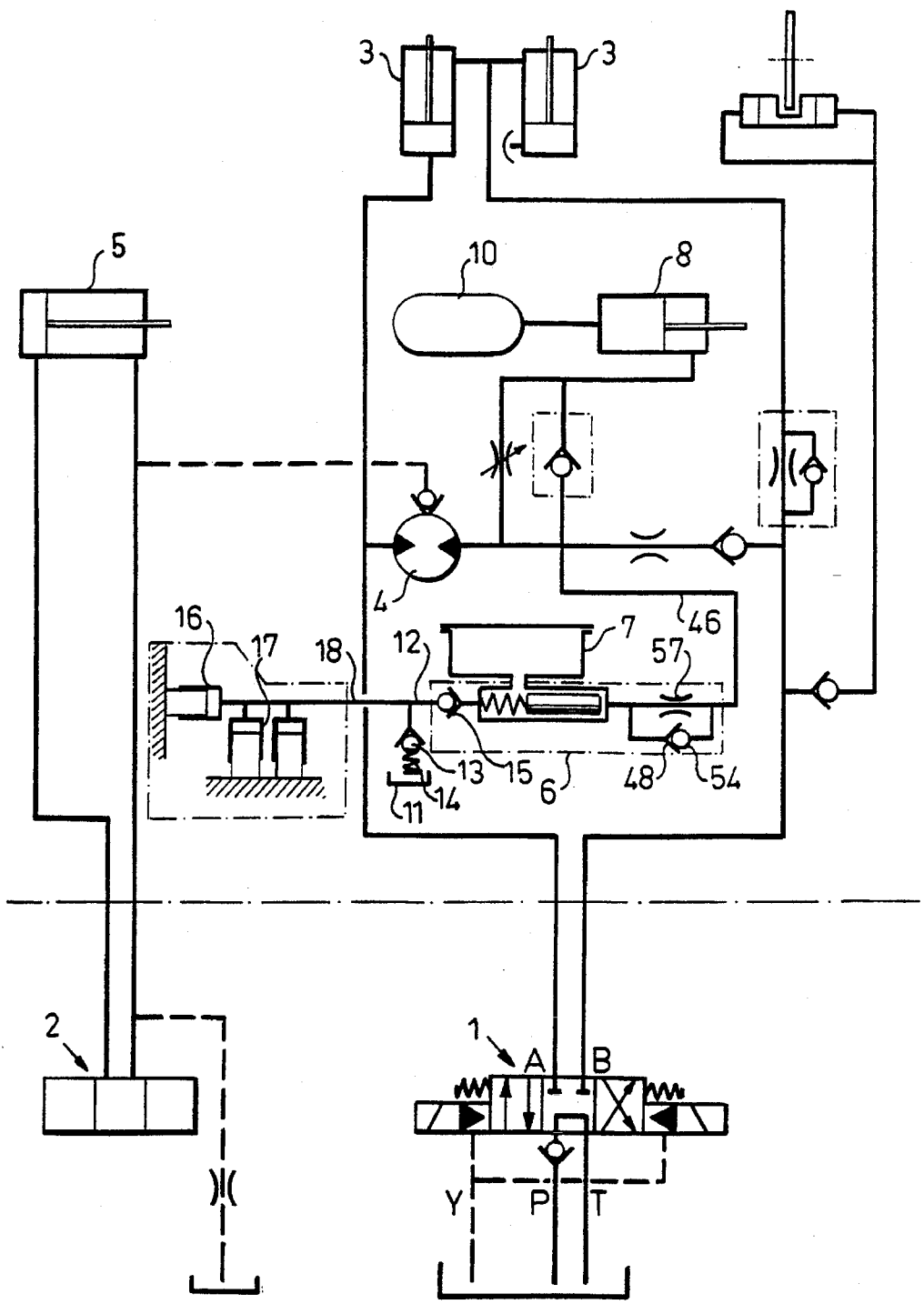
FIG. 1 is a hydraulic system included in a saw assembly according to the invention.
Figure 2:
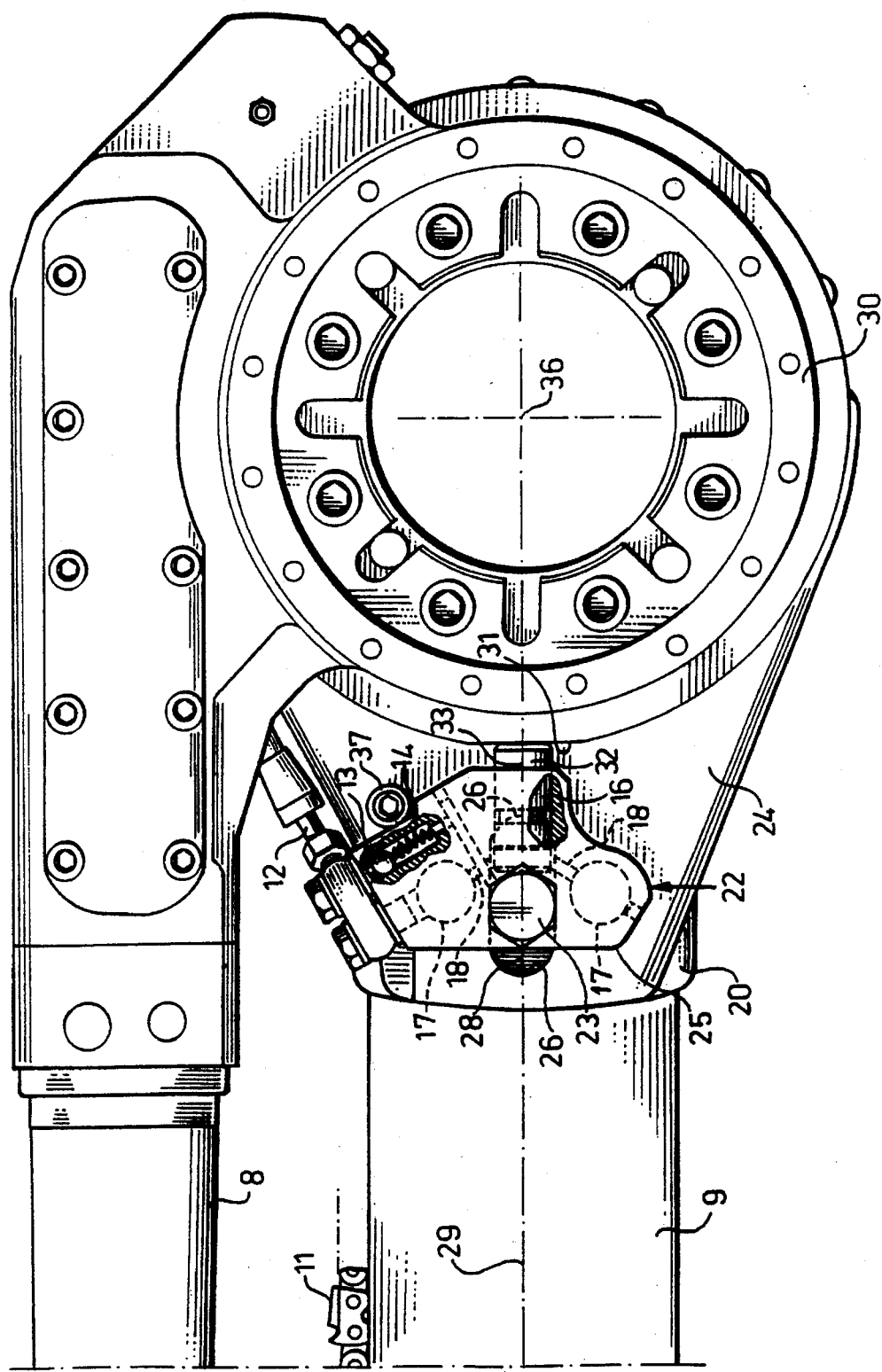
FIG. 2 is a lateral view of part of a saw assembly according to the invention, including the hydraulic system shown in FIG. 1.

The hydraulic circuit diagram illustrated in FIG. 1 comprises two directional valves 1 and 2, which inter alia connect and disconnect two tilt cylinders 3 and a saw motor 4, and a gripping cylinder 5 of a saw assembly, respectively, parts of which can be seen in FIGS. 2 and 3. The circuit, controlled by directional valve 1, also includes a lubricating oil pump 6 which is provided with lubricating oil from a tank 7 and communicates with a feed-out cylinder 8 for feeding out the guide bar 9 of the saw assembly (see FIGS. 2 and 3). 10 denotes an air tank which is in communication with the feed-out cylinder. To achieve the correct feed-out pressure during sawing, the pressure on the hydraulic fluid must be at least 3.0 MPa, for instance. Normally the pressure can be 3.0 MPa, for instance. The pressure in the lubricating oil pump 6 will thus also be 3.0 MPa. The lubricating oil pump requires about 6 bar for its operation, thus guaranteeing a pressure of at least 2.0 MPa after the lubricating oil pump 6.

The lubricating oil pump 6 provides the saw chain 11 of the saw assembly with lubricating oil via a conduit 12 containing a non-return valve 13 with a spring 14 of such strength that the non-return valve 13 only opens its connection to the saw chain 11 when a pressure of 2.0 MPa has been reached in the conduit 12. The pressure of 2.0 MPa is maintained in the conduit 12 since the lubricating oil pump 6 is provided with a non-return valve 15 preventing the oil from flowing out that way either. For stretching the saw chain, the saw assembly comprises first and second hydraulic piston cylinder members 16 and 17 which communicate via a conduit 18 with the conduit 12 at a point located between the non-return valves 13 and 15. The 2.0 MPa pressure inside the conduit 12 is used during operation to continuously activate the piston cylinder members 16, 17. The first piston cylinder member 16 is arranged to stretch the saw chain 11, while the second piston cylinder member 17, suitably comprising two piston cylinders, is arranged to produce a tension which will be explained below. The combination of stretching and tension is so adjusted that a net force of approximately 100N, for instance, is obtained in favour of the stretching function, which is sufficient to stretch the saw chain and keep it taut.

The construciton of a saw assembly having the described hydraulic circuit diagram can be seen more clearly in FIGS. 2 and 3. The bar 9 is fitted between outer and inner bar attachments 19, 20 by means of screws 21. The bar attachments 19, 20 and bar 9 with its saw chain 11 are included in a linearly displaceable unit 22 which is secured by a screw 23 to a bar holder 24 so that the unit 22 is movable in relation to the holder 24. The screw 23 extends through a block element 25 arranged on the side of the holder 24 facing away from the bar 9. The block 25 is parallel with the bar 9 and holder 24. The holder 24 has a longitudinal opening 26 running through it, through which said screw 23 extends. A spacer 27 is also arranged in said opening 26. The spacer 27 surrounds the screw 23 and its end surfaces rest against the inner bar attachment 20 and the block 25. The spacer 27 is somewhat longer than the thickness of the bar holder 24 and a small gap, e.g. 0.2–0.4 mm, is therefore formed between the block 25 and the holder 24. Said opening 26 in the holder has an oval or elongate cross section, the longer central axis 28 extending parallel with the centre line 29 of the bar 9. Besides the bar attachments 19, 20, bar 9 and saw chain 11, said movable unit 22 also includes the screw 23 and spacer 27. With the screw 23 unscrewed, the unit can be moved in relation to the bar holder 24 since the spacer 27 is slidable in one direction or the other in the opening 26, this direction of movement being parallel with the centre line 29 of the bar 9. The holder 24 and the movable unit are rotatably journalled to turn about a shaft 36.

When fitting a saw chain, the screw 23 is first unscrewed so the block 25 shown in FIG. 2, can be turned approximately 30° counter clockwise, after which the bar 9 can be moved a short way back towards the stand 30 to allow the saw chain to be fitted easily around the bar 9 and the drive means of the saw motor 4. When the screw 23 is subsequently tightened the block 25 will be simultaneously turned 30° clockwise to the position shown in FIG. 2 so that the block 25 is pressed against a fixed support 37 on the bar holder 24.

This movement of the unit 22 is controlled by said first piston cylinder 16, its cylinder housing being arranged in the block 25 and its piston rod 32 being in contact with a fixed support 31 on the bar holder 24. The central axis 33 of the piston cylinder is located in a plane coinciding with the centre line 29 of the bar 9. The previously mentioned piston cylinders 17 are arranged in the block 25 and extend parallel with and on each side of the screw 23. The piston cylinders 17 are arranged in the block 25 and influence the holder 24 with their piston rods 35 via friction-reducing slide plates 34. With the aid of the piston cylinders 17 the movable unit 22 is positioned against the holder 24 and the clearance between holder 24 and block 25 is kept under control so that no movement can normally occur between them. However, this positioning is flexible since the pressure medium behind the piston cylinders 17 is compressible. If the bar 9 is subjected to a force from above, the piston cylinders 17 cannot counter this force and will therefore be pressed in. Since the gap between holder 24 and block 25 need not be more than a few tenths of a millimeter, this entails no problem. Furthermore dirt is unable to enter and at the new sawing phase the piston cylinders 17 will close the clearance so that the function becomes normal.

Reverting to fitting of the saw chain 11: when the block 25 has been rotated back to its operative position as shown in FIG. 2, the chain 11 will automatically be stretched by the bar 9 under the influence of the piston cylinder 16. This occurs immediately when the saw motor 4 is connected. At the same time as the piston cylinder 16 is influenced by the pressure in the conduit 18, the piston cylinders 17 will also be caused to press the movable unit 22 against the holder 24.

The pressure in the conduit 18 is increased at each stroke of the saw and when it exceeds 2.0 MPa the ball in the non-return valve 13 will open and the saw chain 11 will receive a dose of lubricant. If the bar 9 or saw chain 11 is influenced by an external force endeavouring to slacken the chain, this will result in the piston rod 32 being pressed into the block 25. Since the piston rods 35 strive to brake this backward movement, considerable force is required to reach a pressure of 2.0 MPa before the oil leaks out to the saw chain 11 to lubricate it. FIG. 4 shows a suitable embodiment of a lubricating oil pump 6 for automatic lubrication of the chain 11 of the motor saw. The lubricating oil pump comprises a casing 40 with a cylindrical chamber 41 and piston 42 movable therein to feed out a portion of lubricating oil from the lubricating oil tank 7 via the outlet in the casing 40 provided with the non-return valve 15. A compression spring 43 is then arranged in the chamber 41 between piston 42 and the outlet from the casing 40, in order to return the piston 42 to a rear starting position past a laterally located supply channel 44 from the lubricating oil tank 7. The outlet of the casing is connected to the saw chain 11 via the conduit 12 for the supply of a portion of lubricating oil corresponding to a lubricating oil volume 45. The rear end of the piston 42 is arranged to be influenced by pressure impulses from the hydraulic cylinder 8 connected to the inlet of the casing by a pressure conduit 46, in order to operate the holder 24 carrying the bar 9 so that the piston 42 is pressed forward to eject a portion of lubricating oil from the chamber 41. The piston 42 is arranged to obtain a pressure impulse every time the hydraulic cylinder 8 is connected. The chamber 41 communicates with the lubricating oil tank 7, located close to the casing 40, via the supply channel 44 which opens into the chamber 41 at a predetermined distance upstream of the casing outlet. A predetermined volume 45 of lubricating oil is thus formed in the chamber 41, determined by the stroke length of the piston 42 calculated from the supply channel 44 after this has been closed by the piston 42.

The lubricating oil tank 7 is suitably secured directly to the casing, forming a unit therewith. A filter 58 is provided at the inlet channel 44. The lubricating oil pump shown is also provided with a nipple 47, screwed into the inlet end. The nipple 47 has an inner wall 48 provided with a central channel 49 having predetermined diameter. The channel 49 opens into a pressure chamber 50 which influences the piston 42. The inner wall 48 defines a space 51 in the nipple, said space being defined rearwardly by an annular element 52 with a large central opening 53, said element being secured in a groove in the nipple. A throttle plate 54 is placed in the space 51 which, when influenced by pressure from one direction or the other, can move freely axially between the wall 48 and the ring element 52. The wall 48 and ring element 52 thus form seat surfaces for the throttle plate 54. The ring element 52 has a peripheral opening 55 permitting pressure medium to flow backwards from the lubricating oil pump at the return stroke of the piston 42. The diameter of the throttle plate 54 is somewhat less than the diameter of the the space 51 and an annular gap 56 is thus formed between them. This annular gap 56 is sufficiently large to permit pressure medium to flow back through the peripheral opening 55 at said return stroke. The described throttle plate 54 and said seat surfaces thus produce the function of a non-return valve preventing pressure medium from being pressed into the pressure chamber 50 other than through a central throttle orifice 57 in the plate 54. The diameter of the throttle orifice 57 is less than said channel 49 in the inner wall 48 of the nipple and is as small as possible to ensure that the flow to the pressure chamber 50 is throttled or retarded in a desired and controllable manner. The function of the throttle orifice is thus to extend the period of time during which a volume of lubricating oil is portioned out to the chain. The diameter of the orifice 57 is suitably about 0.2 mm which gives a desirable extension of the time period of about 1.5–2.0 seconds for portioning out the volume of lubricating oil. Without such throttling the corresponding period would be only 0.2 seconds which would mean that the chain receives no lubrication during the greater part of a sawing process through the tree trunk.

Figure 6:
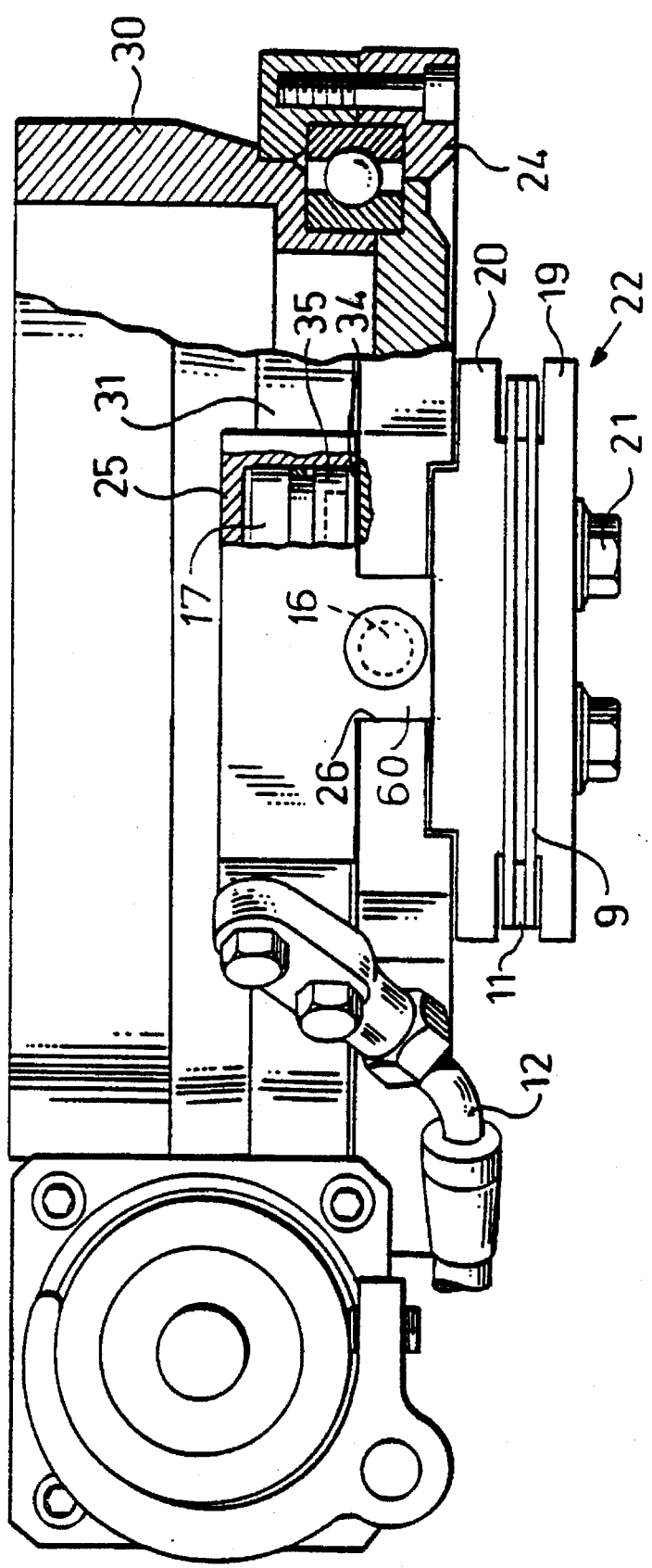
FIG. 6 is an end view similar to that in FIG. 3, of a saw assembly according to a second embodiment of the invention.

FIG. 6 shows an alternative embodiment of the connection between the block element 25 and the bar attachment 20. A connecting piece 60 extends through the oblong opening 26 in the bar holder 24. The connecting piece 60 is slightly longer than the thickness of the bar holder 24 so that a gap is formed between the bar holder 24 and the block element 25, as described earlier. The cross section of the connecting piece is oblong, e.g., substantially rectangular or oval, and the opening 26 is open in the direction of the bar to enable the connecting piece to be freely received in the opening 26 when the unit is mounted onto the bar holder 24.

The connecting piece 60 is manufactured in one piece with the block element 25 and is rigidly joined to the inner bar attachment 20, preferably by means of welding. The piston cylinder 16 is arranged inside the connecting piece 60 of the block element 25 and its piston rod protrudes out of the connecting piece 60 to abut against a support surface formed by the inner wall of the opening 26 in the bar holder. In this case the main part of the block element 25 suitably contains four piston cylinders 17 to enable controlled securing of the unit 22 to the bar holder 24.

The lubricating oil pump may be omitted if desired and the pressure for the piston cylinders 16, 17 can be taken directly from the pressure side of the saw motor via a throttle to regulate the flow of oil to the cylinders and a non-return valve that prevents the oil from flowing back again when sawing is not in progress. Alternatively the in-going pressure can be obtained from other functions such as gripping or turning means.

I claim:

1. A saw assembly comprising a bar (9) mounted in a holder (24), said holder (24) being pivotable about a shaft (36); a saw chain (11) running around the bar (9); a saw motor (4) driving the saw chain; a cylinder (8) to feed the bar (9) in and out during rotation about said shaft (36); a hydraulic circuit system in which said saw motor (4) and said cylinder (8) for feeding in and out are included; a displaceable unit (22) including said bar (9) and mounted on said bar holder (24) to displace the bar (9) in relation to the bar holder (24) in a direction corresponding to a longitudinal centre line (29) of the bar (9) and which is perpendicular to an axis of rotation (36); and a first hydraulic piston cylinder member (16) which is arranged to be activated by said hydraulic circuit system and displace the unit (22) in relation to the bar holder (24) so that during operation of the saw assembly the bar (9) in the unit (22) automatically stretches the saw chain (11), characterized in that said displaceable unit (22) comprises a block element (25) arranged on the side of the bar holder (24) facing away from the bar (9), and joined to an inner bar attachment (20) supporting the bar (9), a small gap thus being formed between opposing surfaces of the bar holder (24) and block element (25), that the first piston cylinder member (16) is arranged in the block element (25) with a piston rod (32) protruding therefrom to abut against a support surface (31) of the bar holder (24), and that a second hydraulic piston cylinder member (17) is arranged in the block element (25), parallel with said shaft (36), a pair of piston rods (35) of the piston cylinder member being arranged to abut against the bar holder (24) with a predetermined total tension force in order, during normal operation, to fix a movable unit (22) to the bar holder (24) and eliminate the clearance produced by said gap, said tension being less than the stretching force created by the first piston cylinder member (16), whereby the second piston cylinder member (17) is influenced by the pressure in said hydraulic circuit system.

2. A saw assembly as claimed in claim 1, characterized in that the block element (25) is connected to the inner bar attachment (20) by means of a connecting piece (60) extending through an oblong opening (26) in the bar holder (24) and being slightly longer than the thickness of the bar holder (24) so that said gap is formed between the bar holder (24) and the block element (25), and that a largest centre line (28) of said oblong opening (26) is directed parallel with said longitudinal centre line (29) of the bar (9) in order to permit friction-free displacement of the connecting piece therein and corresponding displacement of the bar (9).

3. A saw assembly as claimed in claim 2, characterized in that the connecting piece is manufactured in one piece with the block element and is rigidly joined to the inner bar attachment (20), perferably by means of welding, and that the oblong opening (26) is open in the direction of the bar to enable the connecting piece to be freely received when the unit is fitted onto the bar holder (24).

4. A saw assembly as claimed in claim 2, characterized in that the piston cylinder (16) for stretching the chain is arranged inside the connecting piece (60) of the block element (25) and protrudes therefrom to cooperate with a support surface of the bar holder (24) in the form of the inner end wall of said opening (26).

5. A saw assembly as claimed in claim 1, characterized in that the block element (25) is connected to the inner bar attachment (20) by means of a bolt (23) extending through an oblong opening (26) in the bar holder (24) and being surrounded by a spacer (27) having a length somewhat greater than the thickness of the bar holder (24) so that said gap is formed between the bar holder (24) and the block element (25), and that the largest centre line (28) of said oblong opening (26) is directed parallel with said longitudinal centre line (29) of the bar (9) in order to permit friction-free displacement of the bolt (23) and spacer (27) therein and corresponding displacement of the bar (9).

* * * * *